US012666246B2

(12) United States Patent
Liang et al.

(10) Patent No.: US 12,666,246 B2
(45) Date of Patent: Jun. 23, 2026

(54) MULTI-SIM DEVICE HANDLING VIA ENTITLEMENT SERVER

(71) Applicant: T-Mobile Innovations LLC, Overland Park, KS (US)

(72) Inventors: Ying Sheng Liang, Auburn, WA (US); Anthony Yiu, Newcastle, WA (US)

(73) Assignee: T-Mobile Innovations LLC

( * ) Notice: Subject to any disclaimer, the term of this patent is extended or adjusted under 35 U.S.C. 154(b) by 303 days.

(21) Appl. No.: 18/366,579

(22) Filed: Aug. 7, 2023

(65) Prior Publication Data

US 2025/0056201 A1     Feb. 13, 2025

(51) Int. Cl.
H04W 8/18 (2009.01)
H04W 60/04 (2009.01)
H04W 88/06 (2009.01)

(52) U.S. Cl.
CPC ............. H04W 8/18 (2013.01); H04W 60/04 (2013.01); H04W 88/06 (2013.01)

(58) Field of Classification Search
CPC ..... H04W 8/183; H04W 8/205; H04W 68/12; H04W 48/14
USPC ........................................................ 455/558
See application file for complete search history.

(56) References Cited

U.S. PATENT DOCUMENTS

| | | | |
|---|---|---|---|
| 9,648,491 B2 * | 5/2017 | Chen ..................... | H04W 8/183 |
| 11,093,202 B2 * | 8/2021 | Zhu ................... | H04M 1/72454 |

| | | | |
|---|---|---|---|
| 11,418,958 B1 | 8/2022 | Siryy et al. | |
| 2012/0231763 A1 | 9/2012 | Zeng et al. | |
| 2013/0303122 A1 | 11/2013 | Li et al. | |

(Continued)

FOREIGN PATENT DOCUMENTS

| | | | | |
|---|---|---|---|---|
| BR | 112020013687 A2 * | 12/2020 | ......... | H04L 41/0806 |
| CN | 107484154 A * | 12/2017 | .............. | H04W 4/24 |

(Continued)

OTHER PUBLICATIONS

M. Srivastava, S. Mehrotra and J. Kaur, "Innovative Approach to Decentralized Self-Managed eSIM D2D Device Migration With Minimal Carrier Intervention—A Framework," 2025 6th International Conference on Recent Advances in Information Technology (RAIT), Dhanbad, India, 2025, pp. 1-6. (Year: 2025).*

(Continued)

*Primary Examiner* — William D Cumming

(57) ABSTRACT

A method for managing a dual subscriber identity module (SIM) device is performed by an entitlement server. The method comprises receiving and storing a status of a SIM indicating that the SIM is off from a mobile communication device comprising at least two SIMs. The method also comprises receiving a transfer SIM request from a transfer mobile communication device to transfer the SIM from the mobile communication device to the transfer mobile communication device. The method further comprises, in response to receiving the transfer SIM request, notifying, by the entitlement server based on the stored status of the SIM, at least one of the mobile communication device or the transfer mobile communication device that the SIM is off on the mobile communication device to enable the SIM to be turned on for initiation of the transfer of the SIM from the mobile communication device to the transfer mobile communication device.

20 Claims, 7 Drawing Sheets

(56)                References Cited

U.S. PATENT DOCUMENTS

| | | | |
|---|---|---|---|
| 2015/0237497 A1* | 8/2015 | Chen ..................... H04W 8/183 |
| | | | 455/558 |
| 2016/0127176 A1 | 5/2016 | Edara et al. |
| 2016/0373880 A1 | 12/2016 | Khan et al. |
| 2018/0352417 A1 | 12/2018 | Butler et al. |
| 2021/0084486 A1 | 3/2021 | Chauhan et al. |
| 2021/0200494 A1* | 7/2021 | Zhu ................... H04M 1/72469 |
| 2023/0292287 A1* | 9/2023 | Ceendhralu .......... H04W 68/12 |
| 2024/0023005 A1* | 1/2024 | Wang .................... H04W 48/14 |
| 2024/0406707 A1 | 12/2024 | Homorodi et al. |
| 2025/0056201 A1* | 2/2025 | Liang ................... H04W 8/205 |

FOREIGN PATENT DOCUMENTS

| | | | | |
|---|---|---|---|---|
| CN | 114205805 A | * | 3/2022 | ............. G06F 9/451 |
| CN | 116456324 A | * | 7/2023 | ............ H04W 8/183 |
| CN | 116456324 B | * | 11/2023 | ............ H04W 8/183 |
| DE | 102004003308 A1 | * | 8/2005 | .......... H04M 1/2757 |
| DE | 102006040086 A1 | | 3/2008 | |
| EP | 1569475 A1 | | 8/2005 | |
| EP | 1723815 B1 | * | 8/2010 | .......... H04M 1/2757 |
| EP | 4422233 A1 | * | 8/2024 | ............ H04W 12/06 |
| EP | 4472257 A1 | | 12/2024 | |
| KR | 20230169166 A | * | 12/2023 | ............ H04W 8/183 |
| KR | 20250035820 A | * | 3/2025 | .............. H04W 8/18 |
| WO | WO-2005071990 A1 | * | 8/2005 | .......... H04M 1/2757 |
| WO | 20200234037 A1 | | 11/2020 | |
| WO | WO-2021017894 A1 | * | 2/2021 | ............ H04L 67/56 |
| WO | WO-2022156572 A1 | * | 7/2022 | ........ H04W 52/0274 |
| WO | WO-2023273540 A1 | * | 1/2023 | ............ H04W 60/04 |
| WO | WO-2023124258 A1 | * | 7/2023 | ............ H04W 8/183 |
| WO | WO-2024175747 A1 | * | 8/2024 | ............ H04W 12/06 |
| WO | WO-2025112827 A1 | * | 6/2025 | ............ H04W 88/06 |

OTHER PUBLICATIONS

Foreign Communication From a Related Counterpart Application, EP Extended Search Report and EP Search Opinion dated Nov. 6, 2024, EP Application No. 24175266.6.

Restriction Requirement dated Sep. 2, 2025, U.S. Appl. No. 18/325,921, filed May 30, 2024.

Homorodi, Zoltan, et al., "Over-The-Air SIM and Device Configuration via Entitlement Server," filed May 30, 2023, U.S. Appl. No. 18/325,921.

Office Action dated Mar. 4, 2026, U.S. Appl. No. 18/325,921, filed May 30, 2024.

* cited by examiner

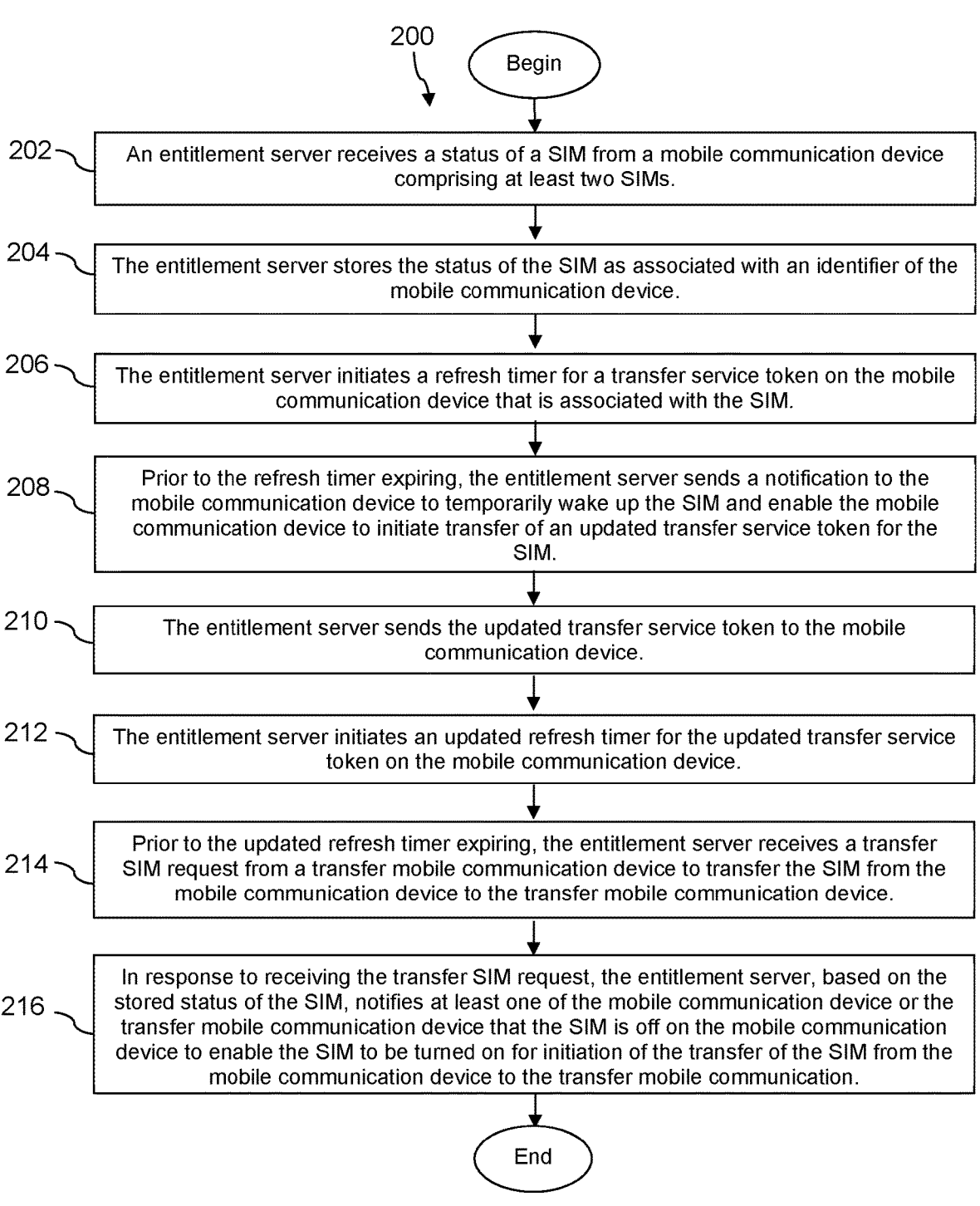

200

Begin

202 — An entitlement server receives a status of a SIM from a mobile communication device comprising at least two SIMs.

204 — The entitlement server stores the status of the SIM as associated with an identifier of the mobile communication device.

206 — The entitlement server initiates a refresh timer for a transfer service token on the mobile communication device that is associated with the SIM.

208 — Prior to the refresh timer expiring, the entitlement server sends a notification to the mobile communication device to temporarily wake up the SIM and enable the mobile communication device to initiate transfer of an updated transfer service token for the SIM.

210 — The entitlement server sends the updated transfer service token to the mobile communication device.

212 — The entitlement server initiates an updated refresh timer for the updated transfer service token on the mobile communication device.

214 — Prior to the updated refresh timer expiring, the entitlement server receives a transfer SIM request from a transfer mobile communication device to transfer the SIM from the mobile communication device to the transfer mobile communication device.

216 — In response to receiving the transfer SIM request, the entitlement server, based on the stored status of the SIM, notifies at least one of the mobile communication device or the transfer mobile communication device that the SIM is off on the mobile communication device to enable the SIM to be turned on for initiation of the transfer of the SIM from the mobile communication device to the transfer mobile communication.

End

FIG. 2

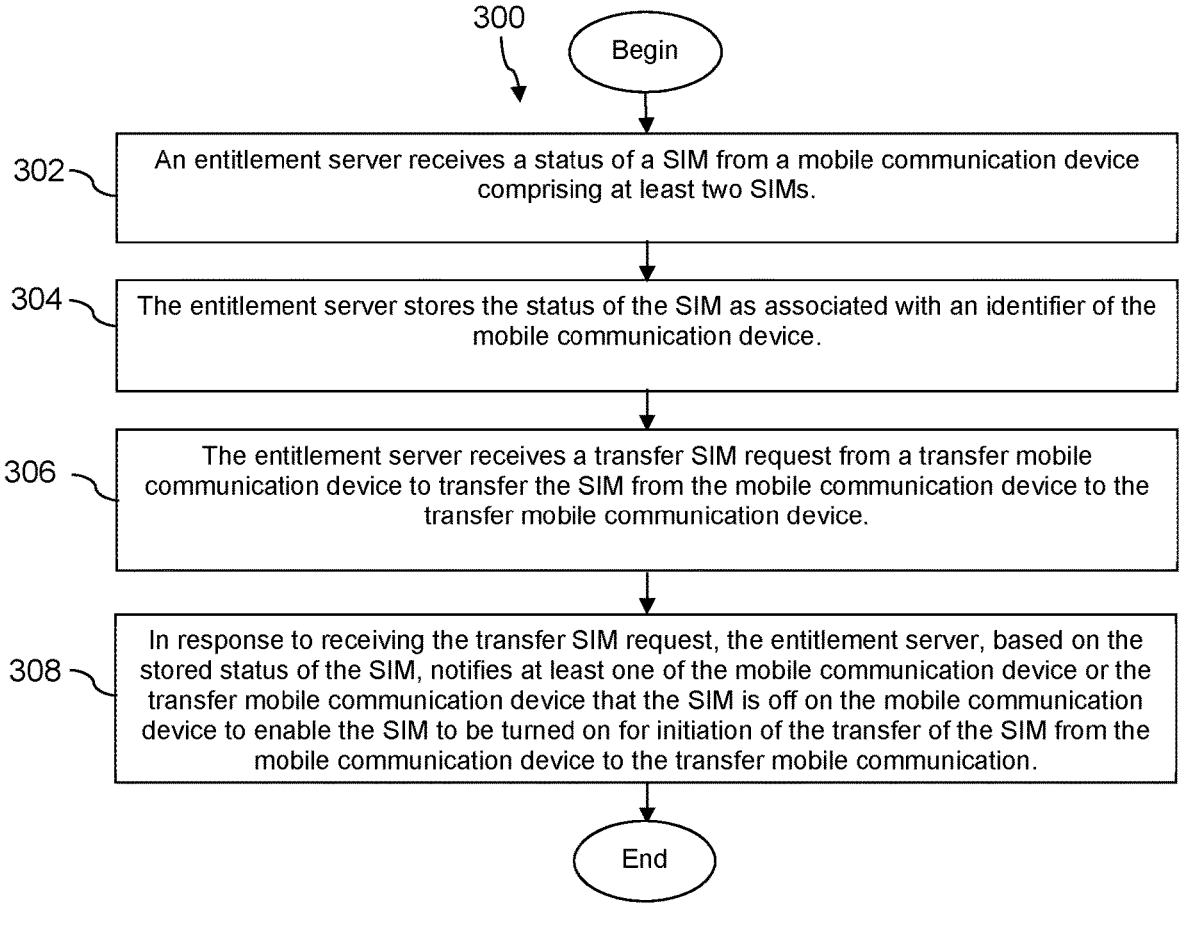

300

Begin

302 — An entitlement server receives a status of a SIM from a mobile communication device comprising at least two SIMs.

304 — The entitlement server stores the status of the SIM as associated with an identifier of the mobile communication device.

306 — The entitlement server receives a transfer SIM request from a transfer mobile communication device to transfer the SIM from the mobile communication device to the transfer mobile communication device.

308 — In response to receiving the transfer SIM request, the entitlement server, based on the stored status of the SIM, notifies at least one of the mobile communication device or the transfer mobile communication device that the SIM is off on the mobile communication device to enable the SIM to be turned on for initiation of the transfer of the SIM from the mobile communication device to the transfer mobile communication.

End

App 1     App 2     App 3

Browser    Phone    Camera

602

620

MULTI-SIM DEVICE HANDLING VIA ENTITLEMENT SERVER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices include one or more Subscriber Identity Module (SIM) card. A SIM card is an integrated circuit that is intended to securely store the International Mobile Subscriber Identity (IMSI) number and its related key, as well as other information. The IMSI and its key are used to identify and authenticate a subscriber device for attachment to a radio access network (RAN) of a mobile service provider, for example to receive a wireless link from a cell site. A SIM card may be a physical SIM card, which may be removable, or an embedded SIM card (eSIM). An eSIM is a digital version of a physical SIM card. The physical SIM card may comprise a universal integrated circuit card (UICC) physical smart card. The eSIM may comprise an embedded UICC (eUICC).

SUMMARY

In an embodiment, a method for managing a dual subscriber identity module (SIM) device is disclosed. The method comprises receiving, by an entitlement server, a status of a SIM from a mobile communication device comprising at least two SIMs. The status of the SIM indicates that the SIM is off. The method also comprises storing, by the entitlement server, the status of the SIM as associated with an identifier of the mobile communication device, initiating, by the entitlement server, a refresh timer for a transfer service token on the mobile communication device that is associated with the SIM, and prior to the refresh timer expiring, sending, by the entitlement server, a notification to the mobile communication device to temporarily wake up the SIM and enable the mobile communication device to initiate transfer of an updated transfer service token for the SIM. The method additionally comprises sending, by the entitlement server, the updated transfer service token to the mobile communication device, re-initiating, by the entitlement server, the refresh timer for the updated transfer service token on the mobile communication device, and prior to the re-initiated refresh timer expiring, receiving, by the entitlement server, a transfer SIM request from a transfer mobile communication device to transfer the SIM from the mobile communication device to the transfer mobile communication device. The method further comprises, in response to receiving the transfer SIM request, notifying, by the entitlement server based on the stored status of the SIM, at least one of the mobile communication device or the transfer mobile communication device that the SIM is off on the mobile communication device to enable the SIM to be turned on for initiation of the transfer of the SIM from the mobile communication device to the transfer mobile communication device, whereby the SIM is transferred from the mobile communication device to the transfer mobile communication device based on the updated transfer service token without a need for reauthentication.

In another embodiment, an entitlement server that manages a dual subscriber identity module (SIM) device is disclosed. The entitlement server comprises at least one non-transitory memory, at least one processor, and an application stored in the at least one non-transitory memory. The application, when executed by the at least one processor, receives a status of a SIM from a mobile communication device comprising at least two SIMs. The status of the SIM indicates that the SIM is off. The application, when executed by the at least one processor, also stores the status of the SIM as associated with an identifier of the mobile communication device and initiates a refresh timer for a service token on the mobile communication device that is associated with the SIM. The application, when executed by the at least one processor, additionally, prior to the refresh timer expiring, sends a notification to the mobile communication device to temporarily wake up the SIM and enable the mobile communication device to initiate transfer of an updated service token for the SIM, and sends the updated service token to the mobile communication device, whereby the SIM is activated on the mobile communication device based on the updated service token without a need for reauthentication.

In yet another embodiment, a method for managing a dual subscriber identity module (SIM) device is disclosed. The method comprises receiving, by an entitlement server, a status of a SIM from a mobile communication device comprising at least two SIMs. The status of the SIM indicates that the SIM is off. The method also comprises storing, by the entitlement server, the status of the SIM as associated with an identifier of the mobile communication device and receiving, by the entitlement server, a transfer SIM request from a transfer mobile communication device to transfer the SIM from the mobile communication device to the transfer mobile communication device. The method further comprises, in response to receiving the transfer SIM request, notifying, by the entitlement server based on the stored status of the SIM, at least one of the mobile communication device or the transfer mobile communication device that the SIM is off on the mobile communication device to enable the SIM to be turned on for initiation of the transfer of the SIM from the mobile communication device to the transfer mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is a flow chart of a method according to an embodiment of the disclosure.

FIG. 3 is a flow chart of a method according to an embodiment of the disclosure.

DETAILED DESCRIPTION

Figure 1:
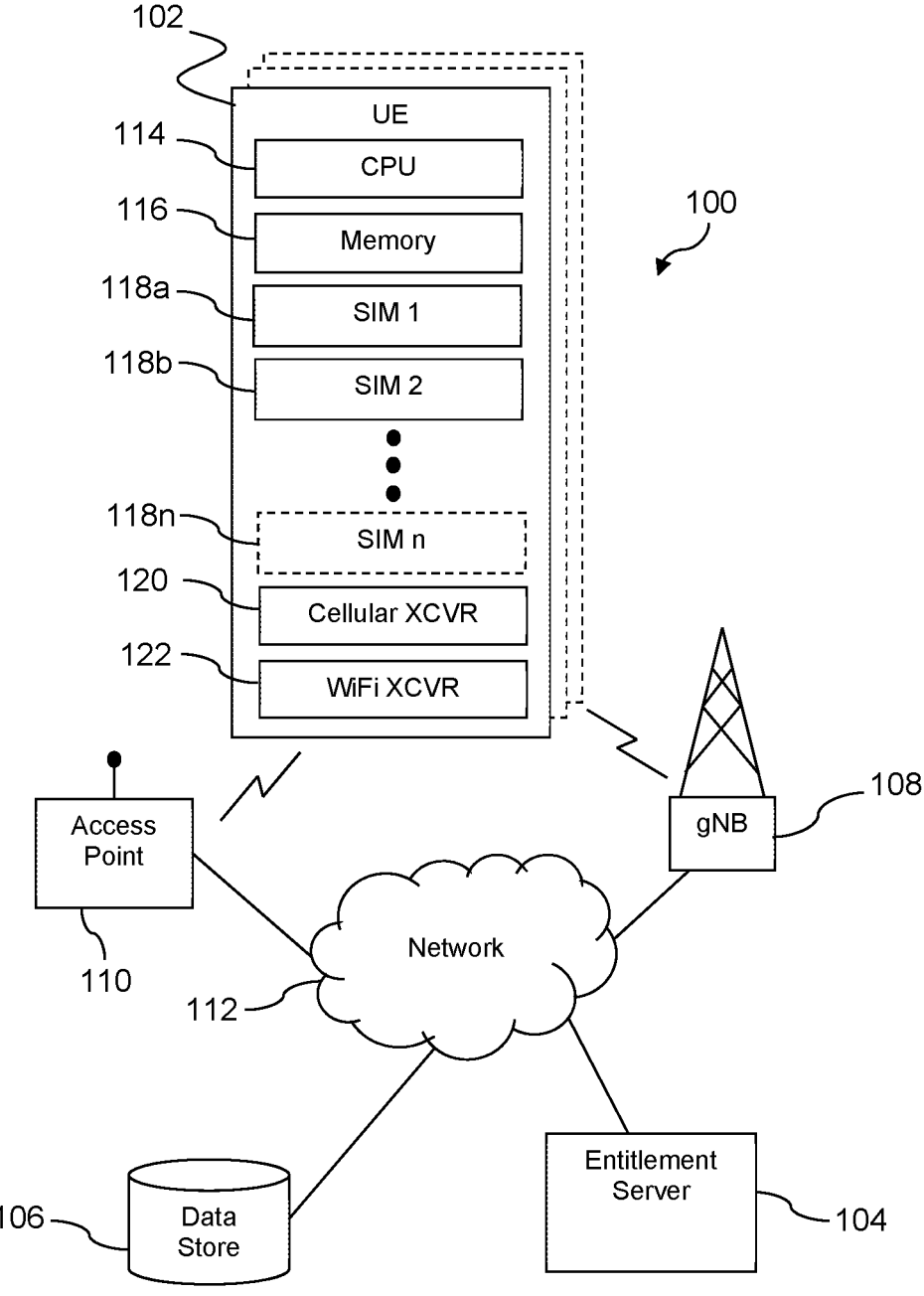
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some mobile communication devices are provided with a plurality of subscriber identity modules (SIMs). These mobile devices may be referred to as multi-SIM devices. One particular example, of a multi-SIM device is a dual SIM device that comprises two SIMs. In the specific example of a dual SIM device, the SIMs can be (A) two traditional physical SIMs, (B) one traditional physical SIM and one embedded SIM (eSIM), or (C) two eSIMs. A user may manually toggle between SIMs or the mobile communication device may automatically toggle between SIMs for various reasons. For example, one SIM may be used for work and a different SIM may be used for personal use. In another example, one SIM may be used while the mobile communication device is in a particular country and a different SIM may be used while the mobile communication device is in a different country.

In multi-SIM devices, when a SIM on the mobile communication device is turned off or disabled, an entitlement system (e.g., an entitlement server) in the carrier network is unaware of this. Thus, service tokens associated with the SIM can undesirably expire and cause a poor user experience. For example, if a service token expires while a SIM is off and then the SIM is turned on, the SIM would not be able to automatically be activated. Instead, the SIM would have to reauthenticate or service requests from the SIM would fail, which may frustrate the user having to wait on reauthentication.

In the SIM transfer context, there may be a transfer service token associated with the SIM. If the transfer service token expires (for example because the SIM is off), the SIM will not be able to be transferred to a transfer mobile communication device without reauthentication. Further, a SIM cannot be transferred while the SIM is off (i.e., the SIM has to be on to be transferred). If a SIM transfer request is initiated for a SIM and the SIM happens to be off (perhaps unbeknownst to the user), the SIM transfer request would fail. Both of these issues in the SIM transfer context may lead to a poor experience for the user.

The pending application addresses the above multi-SIM device issues by having the mobile communication device send a notification to an entitlement server when the SIM is turned off or turned on, using a new entitlement application programming interface (API). The entitlement server stores this SIM status information as associated with the mobile communication device. Later, during different use cases, the entitlement server can take advantage of this stored information to better serve the subscriber and provide a better user experience. For example, if a SIM transfer request is received to transfer a SIM to a transfer mobile communication device and the entitlement server determines that the SIM is off based on the stored information, the entitlement server notifies at least one of the mobile communication device or the transfer mobile communication device that the SIM is off such that the SIM can be turned on and the transfer of the SIM from the mobile communication device to the transfer mobile communication device can begin.

As discussed above, service tokens associated with a SIM may expire especially when a SIM is off. Since the entitlement server will know when a SIM is off based on the reported status of the SIM from the mobile communication device, the entitlement server can initiate refresh timers for the service tokens, and prior to expiration, prompt the SIM to temporarily wake up, refresh the about to expire service token(s), and return to sleep or its off state. While the SIM is temporarily woken up and returned to sleep, the SIM is still considered inactive in that UE does not communicate via that SIM. As part of this process to update service token(s) associated with a SIM that is turned off, the active SIM may be briefly cycled off and on to allow the SIM to temporarily wake up, refresh the about to expire service token(s), and be put back to sleep. The temporary cycling of the active SIM on and off while the service token(s) on the other SIM are updated is done in a minimally invasive way such that it does not impact the end user's use of the UE or use of the intended to be active SIM on the UE. This process of briefly cycling an active SIM so that a SIM in need of updated service token(s) is temporarily woken up to receive the updated service token(s) and then put back to sleep enables that SIM to be activated later without needing to be reauthenticated because the service token(s) are not expired.

One particular service token that may expire when a SIM is off is the transfer service token. As discussed above, if the transfer service token is expired, a transfer SIM request fails. Having the entitlement server initiate a refresh timer for the transfer service token and, prior to expiration, prompt the SIM to temporarily wake up, refresh the about to expire transfer service token, and turn off again, enables a SIM to be transferred successfully without needing to reauthenticate the transfer service token. This process of updating the service token(s) about to expire may occur independently of and unnoticed by the subscriber.

In addition to sending the status of each SIM on the multi-SIM device, the mobile communication device may also send a SIM type indication of each SIM to the entitlement server, such as via the new entitlement API. The SIM type indication of each SIM may be sent in response to each SIM being provisioned. The SIM type indication for each SIM may be stored by the entitlement server along with the status of each SIM. The SIM type indication may be verified by the entitlement server communicating with a different server. For example, if the SIM type is an eSIM type, the entitlement server may verify with a Subscription Manager Data Preparation (SM-DP+) server that the SIM is in fact an eSIM. Different services may be provided to the mobile communication device depending on whether the SIM is a physical SIM type or an eSIM type. Thus, the SIM type indication may be used to provide the correct services to the mobile communication device.

Turning now to FIG. 1, a communication system 100 according to the disclosure is described. In an embodiment, the system 100 comprises User Equipment (UE) 102, an entitlement server 104, a data store 106, which communicate by wired or wireless communication links via a network 112. The UE 102 may be a handheld device, such as a smart phone or tablet, or a laptop computer, communicating wirelessly with the network 112. The network 112 may be one or more public networks, one or more private networks, or a combination thereof. The network 112 may comprise or be coupled to a 5G core network or, in other embodiments, a 4G or 4G Long Term Evolution (LTE) network.

In an embodiment, the UE 102 comprises a processor 114, a non-transitory memory 116, a plurality of SIMs 118 (represented as 118a, 118b, 118n), a cellular radio transceiver 120, and a WiFi transceiver 122. The UE 102 may be a dual SIM device that comprises two SIMs (e.g., SIM 1 118a and SIM 2 118b). The SIMS 118 may be physical SIMs or embedded SIMs (eSIMs).

When properly activated and provisioned, the UE 102 may be able to establish a wireless communication link to a radio access network (RAN), for example to a Next Generation enhanced Node B (gNB) 108. The gNB 108 may also be referred to as a cell site or cell tower in some contexts. The gNB 108 may provide the UE 102 a communication link to the network 112. The UE 102 may communicate via the gNB 108 and via the network 112 to the entitlement server 104.

The UE 102 may be able to establish a WiFi communication link (or WiFi connection) to the network 112, for example via a WiFi access point 110. The access point 110 may provide the UE 102 a WiFi connection to the network 112. The UE 102 may communicate via the access point 110 and via the network 112 to the entitlement server 104.

The entitlement server 104 provides management of and entitlement for various services on the UE 102. For example, the entitlement server 104 may provide to the UE 102 entitlement verification for the activation of services such as SMS over IP, Voice-over-Wi-Fi, Voice-over-LTE, On-Device Service Activation of eSIM companion devices, data plan information, or other services. The entitlement server 104 may receive a status of each SIM 118 from the UE 102 each time the SIM 118 is turned on or off. The status may be sent by the UE 102 via an entitlement API. The status may indicate that each SIM 118 is on or off. The SIM 118 may have a status of on if the SIM 118 is enabled or active on the UE 102. The SIM 118 may have a status of off if it is inactive or disabled. If the SIM 118 is turned off or disabled, the UE 102 is unable to communicate via that SIM 118. The SIM 118 may have been turned off or disabled to allow another SIM to be turned on or enabled such as when the UE 102 changes location (e.g., to a foreign country), at different times of day (e.g., during business hours versus non-business hours), or for other reasons.

The entitlement server 104 may store the status of each SIM 118 as associated with an identifier of the UE 102. The identifier of the UE 102 may comprise the International Mobile Equipment Identity (IMEI) of the UE or another identifier of the UE. The entitlement server 104 may store the status of each SIM 118 in the data store 106. Alternatively, the entitlement server 104 may cache the status of each SIM 118 at the entitlement server 104. Caching the status of each SIM 118 at the entitlement server 104 may include storage of such data in a temporary storage location (i.e., a cache). Caching data at the entitlement server 104 may enable quicker retrieval of the data and quicker response times for the entitlement server 104 when compared to storing the data in the data store 106.

In addition to storing the status of each SIM 118, the entitlement server 104 may receive a SIM type indicator of each SIM 118 from the UE 102. The SIM type indicator for each SIM 118 may be sent when each SIM 118 is provisioned on the UE 102. The entitlement server 104 may store the SIM type indicator of each SIM 118 in the data store 106. Alternatively, the entitlement server 104 may cache the SIM type indicator status of each SIM 118 at the entitlement server 104. Caching the SIM type indicator of each SIM 118 at the entitlement server 104 may include storage of such data in a temporary storage location (i.e., a cache), which may allow quicker retrieval of such data and quicker response times for the entitlement server 104. In an embodiment, the entitlement server 104 provides services to the UE 102 based on the SIM type indicator of the activated SIM 118 (e.g., SIM 1 118a, SIM 2 118b, or SIM n 118n). The entitlement server knows which SIM is activated based on stored status of the SIMS 118 of the UE 102. In some cases, the entitlement server 104 may verify the SIM type indicator received from the UE 102 by communicating with a different server. This verification may occur prior to providing services to the UE 102.

The entitlement server 104 may receive a transfer SIM request to transfer a particular SIM of the plurality of SIMs 118 from the UE 102 to a transfer UE. In response to receipt of the transfer SIM request, the entitlement server 104 may determine the status of the particular SIM 118 (e.g., SIM 1 118a, SIM 2 118b, or SIM n 118n) either by accessing its cache or by accessing the database 106. If the entitlement server 104 determines that the particular SIM 118 is off based on the status stored for the particular SIM 118, the entitlement server 104 may notify at least one of the UE 102 or the transfer UE that the particular SIM 118 is off on the UE 102. In response to the notification from the entitlement server 104, the particular SIM 118 may be turned on allowing the transfer of the particular SIM 118 from the UE 102 to the transfer UE to begin.

In an embodiment, the entitlement server 104 initiates a refresh timer for a service token associated with a SIM 118 (e.g., SIM 1 118a, SIM 2 118b, or SIM n 118n). There may be multiple service tokens associated with the SIM 118. In an embodiment, the service token may be a network authentication service token used during authentication of the SIM into the radio access network. In another embodiment, the service token may be a transfer service token used to transfer the SIM 118 from one UE to another UE. Each service token is associated with a timeout or expiration. Different service tokens may have different timeouts or expirations. The service token timeout or expiration may be maintained by the particular service in the core network. The refresh timer may be maintained by the entitlement server 104. There may be multiple different refresh timers associated with different service tokens. Each refresh timer may comprise a different expiration period. The refresh timer and its expiration period are distinct from the timeout or expiration of the service token. The purpose of the refresh timer is to prompt replacement of an about to expire service token before it actually expires. Since the point of the refresh timer is to prevent expiration of the service token, the refresh timer comprises a shorter expiration period than the expiration or timeout of the service token itself.

The initiation of the refresh timer may be in response to the entitlement server 104 receiving a status indicating that the SIM 118 is off. In some embodiments, the entitlement server 104 may initiate multiple refresh timers for multiple service tokens associated with each of the SIMS 118. The entitlement server 104 may monitor the refresh timer, and prior to expiration of the refresh timer, the entitlement server 104 may send a notification to the UE 102 to temporarily wake up the SIM 118 such that the UE 102 can obtain an updated service token. The entitlement server 104 may then send the updated service token to the UE 102. In an embodiment, in response to sending the updated service token to the UE 102, the entitlement server re-initiates the refresh timer for the updated service token. Re-initiation of the refresh timer may include restoring the refresh timer to an initial value and beginning to count down or up from this initial value. Having the service token(s) associated with each of the SIMS 118 up-to-date and not expired (even if a SIM 118 is off) allows any of the SIMS 118 to be activated on the UE 102 with the need to reauthenticate.

As mentioned above, one particular service token that may be managed by the entitlement server 104 is a transfer service token. The entitlement server 104 may initiate a refresh time for a transfer service token associated with a SIM 118 (e.g., SIM 1 118a, SIM 2 118b, or SIM n 118n). The entitlement server 104 may monitor the refresh timer, and prior to expiration of the refresh timer, the entitlement server 104 may send a notification to the UE 102 to temporarily wake up the SIM 118 such that the UE 102 can obtain an updated transfer service token. The entitlement server 104 may then send the updated transfer service token to the UE 102. In an embodiment, in response to sending the updated transfer service token to the UE 102, the entitlement server re-initiates the refresh timer for the updated transfer service token. Re-initiation of the refresh timer may include restoring the refresh timer to an initial value and beginning to count down or up from this initial value. Having the transfer service token associated with each of the SIMS 118 up-to-date and not expired allows any of the SIMs 118 to be transferred successfully without needing to reauthenticate the transfer service token.

FIG. 2 is a flow chart of a method 200 according to an embodiment of the disclosure. In an embodiment, the method 200 is for managing a multi-SIM device. At step 202, an entitlement server (e.g., entitlement server 104) receives a status of a SIM from a mobile communication device (e.g., UE 102) comprising at least two SIMs (e.g., SIM 1 118a, SIM 2 118b). In an embodiment, the status of the SIM indicates that the SIM is off. At step 204, the entitlement server stores the status of the SIM as associated with an identifier of the mobile communication device. The entitlement server may store the status of the SIM as associated with the identifier of the mobile communication device in a database (e.g., database 106) or cache such information.

At step 206, the entitlement server initiates a refresh timer for a transfer service token on the mobile communication device that is associated with the SIM. At step 208, prior to the refresh timer expiring, the entitlement server sends a notification to the mobile communication device to temporarily wake up the SIM and enable the mobile communication device to initiate transfer of an updated transfer service token for the SIM. At block 210, the entitlement server sends the updated transfer service token to the mobile communication device.

At block 212, the entitlement server initiates an updated refresh timer for the updated transfer service token on the mobile communication device. At block 214, prior to the updated refresh timer expiring, the entitlement server receives a transfer SIM request from a transfer mobile communication device to transfer the SIM from the mobile communication device to the transfer mobile communication device. At block 216, in response to receiving the transfer SIM request, the entitlement server, based on the stored status of the SIM, notifies at least one of the mobile communication device or the transfer mobile communication device that the SIM is off on the mobile communication device to enable the SIM to be turned on for initiation of the transfer of the SIM from the mobile communication device to the transfer mobile communication. In an embodiment, the SIM is transferred from the mobile communication device to the transfer mobile communication device based on the updated transfer service token without a need for reauthentication FIG. 3 is a flow chart of a method 300 according to an embodiment of the disclosure. In an embodiment, the method 300 is for managing a multi-SIM device. At step 302, an entitlement server (e.g., entitlement server 104) receives a status of a SIM from a mobile communication device (e.g., UE 102) comprising at least two SIMs (e.g., SIM 1 118a, SIM 2 118b). In an embodiment, the status of the SIM indicates that the SIM is off. At step 304, the entitlement server stores the status of the SIM as associated with an identifier of the mobile communication device. The entitlement server may store the status of the SIM as associated with the identifier of the mobile communication device in a database (e.g., database 106) or cache such information.

At step 306, the entitlement server receives a transfer SIM request from a transfer mobile communication device to transfer the SIM from the mobile communication device to the transfer mobile communication device. At block 308, in response to receiving the transfer SIM request, the entitlement server, based on the stored status of the SIM, notifies at least one of the mobile communication device or the transfer mobile communication device that the SIM is off on the mobile communication device to enable the SIM to be turned on for initiation of the transfer of the SIM from the mobile communication device to the transfer mobile communication.

Figure 4:
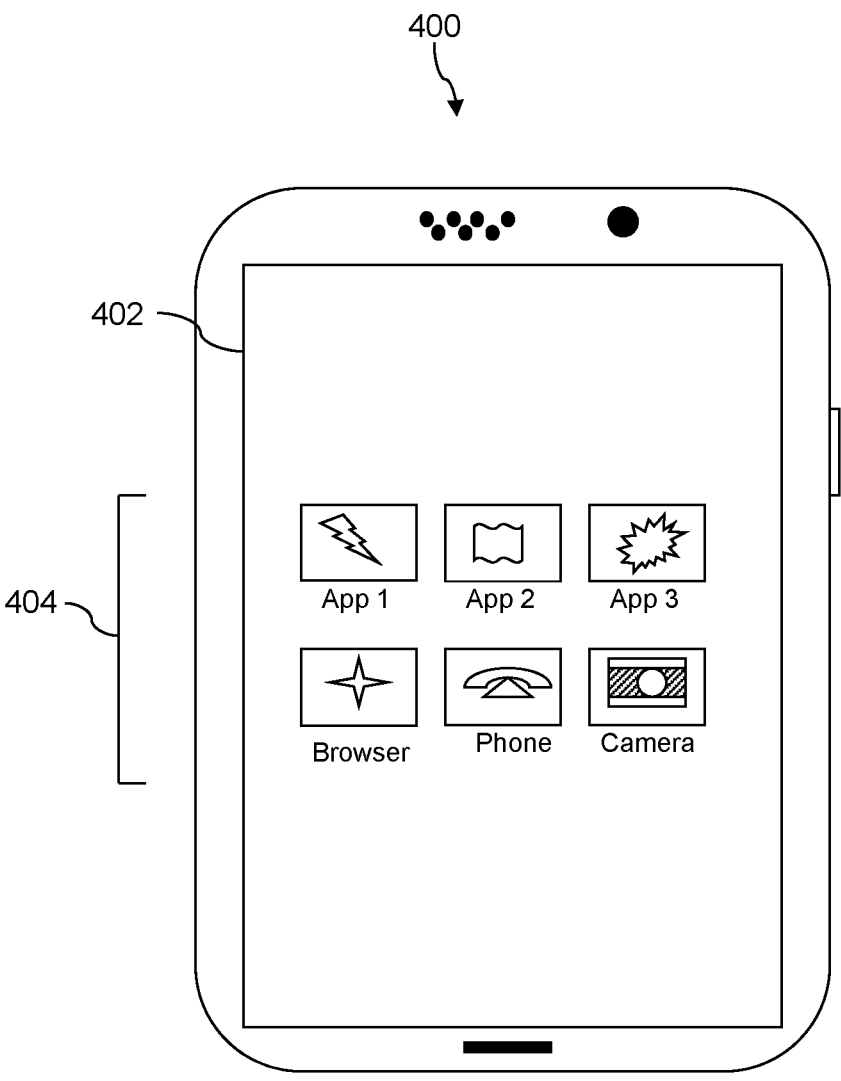
FIG. 4 is an illustration of a wireless communication device according to an embodiment of the disclosure.

Turning to FIG. 4, UE 400 is depicted which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
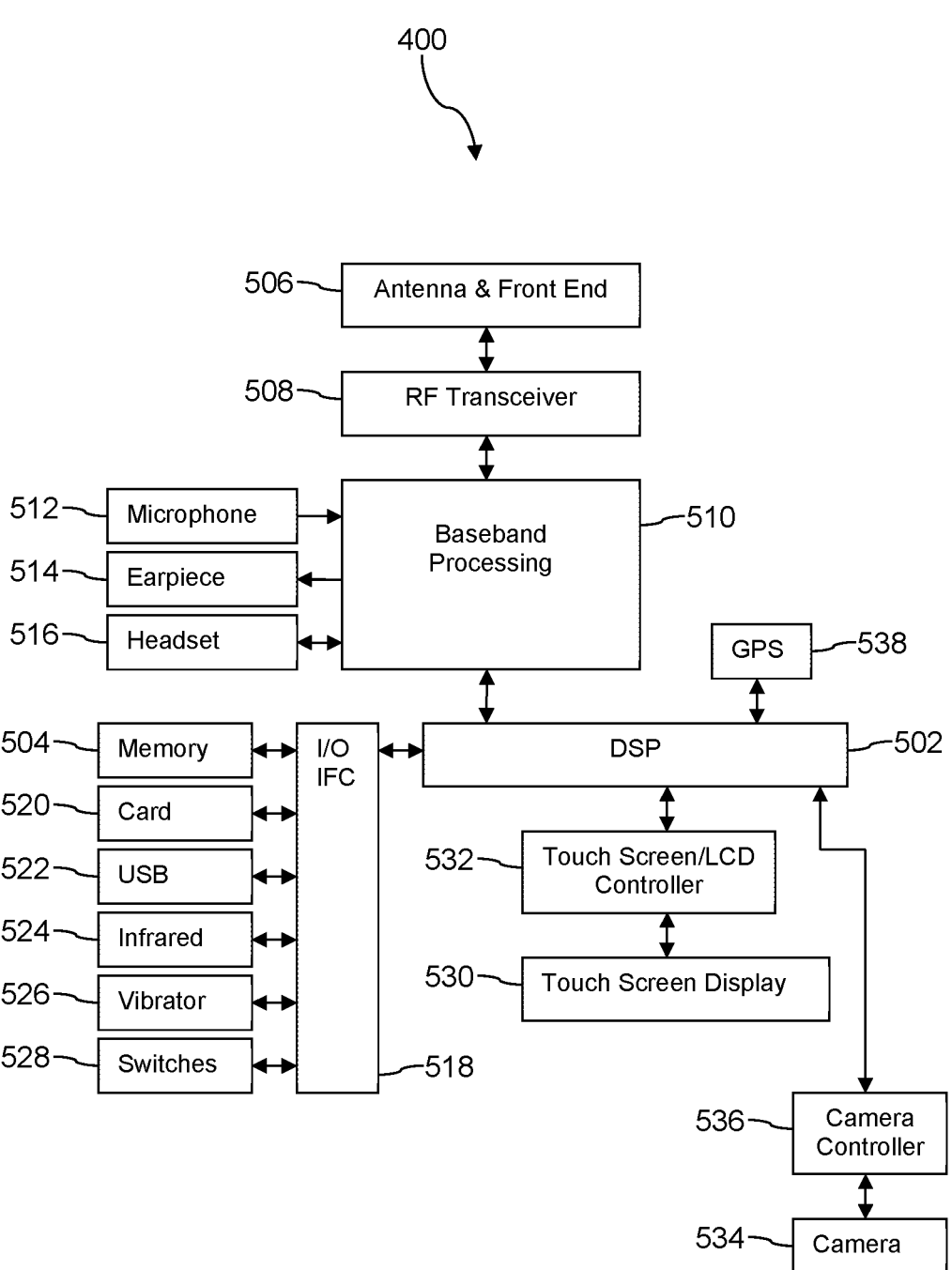
FIG. 5 is a block diagram or a hardware architecture of a wireless communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
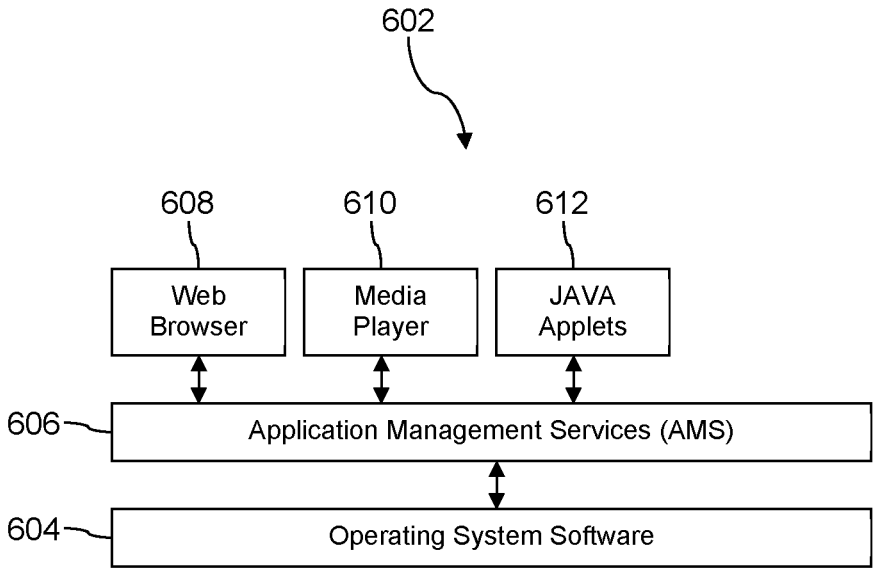
FIG. 6A is a block diagram of a software architecture of a wireless communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
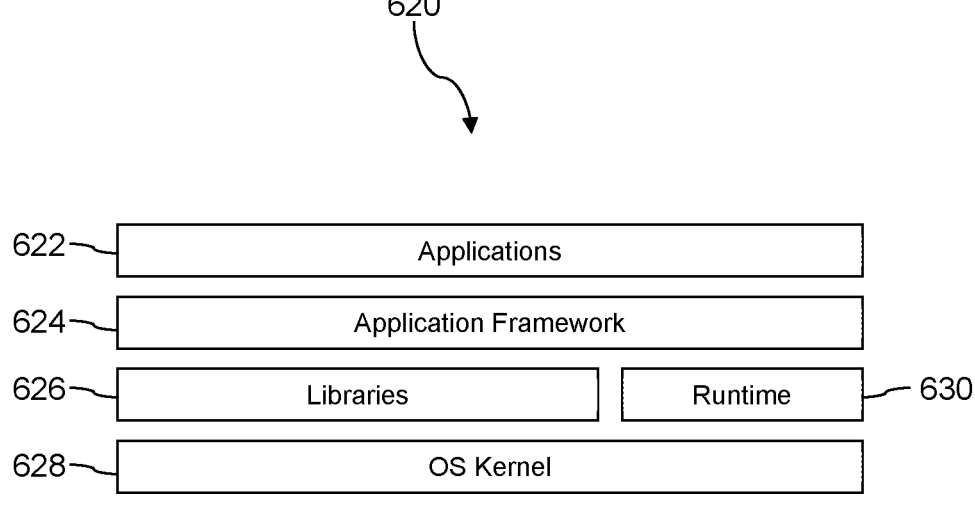
FIG. 6B is a block diagram of another software architecture of a wireless communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
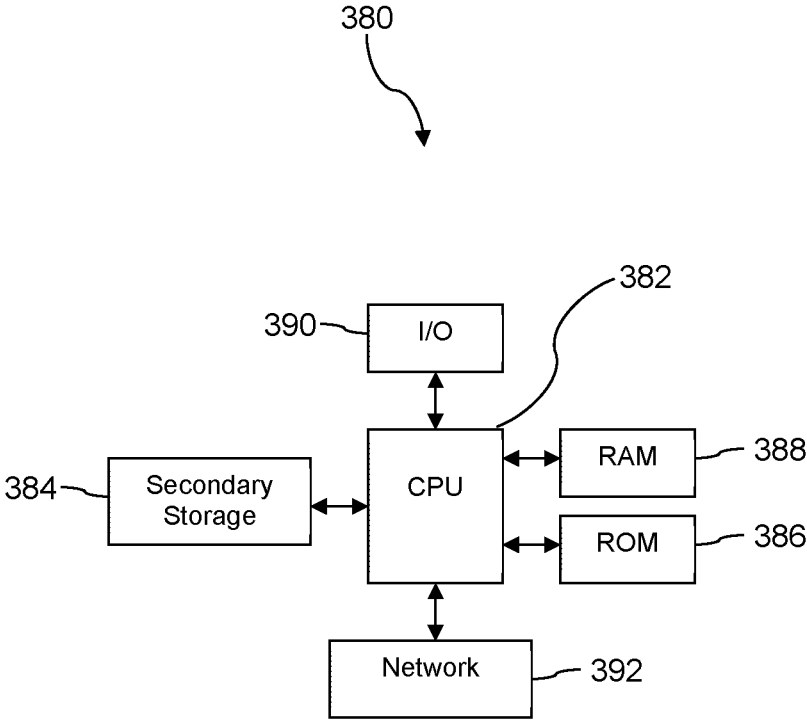
FIG. 7 illustrates a computer system suitable for implementing one or more embodiments disclosed herein.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), a Bluetooth® protocol, a Zigbee® protocol, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing a multi-subscriber identity module (SIM) device, the method comprising:

receiving, by an entitlement server, a status of a SIM from a mobile communication device comprising at least two SIMs, wherein the status of the SIM indicates that the SIM is off;

storing, by the entitlement server, the status of the SIM as associated with an identifier of the mobile communication device;

initiating, by the entitlement server, a refresh timer for a transfer service token on the mobile communication device that is associated with the SIM;

prior to the refresh timer expiring, sending, by the entitlement server, a notification to the mobile communication device to temporarily wake up the SIM and enable the mobile communication device to initiate transfer of an updated transfer service token for the SIM;

sending, by the entitlement server, the updated transfer service token to the mobile communication device;

re-initiating, by the entitlement server, the refresh timer for the updated transfer service token on the mobile communication device;

prior to the re-initiated refresh timer expiring, receiving, by the entitlement server, a transfer SIM request from a transfer mobile communication device to transfer the SIM from the mobile communication device to the transfer mobile communication device; and in response to receiving the transfer SIM request, notifying, by the entitlement server based on the stored status of the SIM, at least one of the mobile communication device or the transfer mobile communication device that the SIM is off on the mobile communication device to enable the SIM to be turned on for initiation of the transfer of the SIM from the mobile communication device to the transfer mobile communication device, whereby the SIM is transferred from the mobile communication device to the transfer mobile communication device based on the updated transfer service token without a need for reauthentication.

2. The method of claim 1, wherein the at least two SIMs comprise two physical SIMs, one physical SIM and one embedded SIM (eSIM), or two eSIMs.

3. The method of claim 1, wherein the status of the SIM is stored in a database.

4. The method of claim 1, wherein the status of the SIM is cached by the entitlement server.

5. The method of claim 1, further comprising receiving, by the entitlement server, a SIM type indication of the SIM from the mobile communication device in response to the SIM being provisioned.

6. The method of claim 5, further comprising verifying, by the entitlement server, the SIM type indication for the SIM by communicating with a different server.

7. The method of claim 5, further comprising receiving, by the entitlement server, a different SIM type indication for a second SIM from the mobile communication device in response to the second SIM being provisioned on the mobile communication device, wherein different services are provided to the mobile communication device when the second SIM is activated on the mobile communication based on the different SIM type indication than when the SIM is activated on the mobile communication device.

8. An entitlement server that manages a dual subscriber identity module (SIM) device, comprising:
   at least one non-transitory memory;
   at least one processor; and
   an application stored in the at least one non-transitory memory, that when executed by the at least one processor:
      receives a status of a SIM from a mobile communication device comprising at least two SIMs, wherein the status of the SIM indicates that the SIM is off,
      stores the status of the SIM as associated with an identifier of the mobile communication device,
      initiates a refresh timer for a service token on the mobile communication device that is associated with the SIM,
      prior to the refresh timer expiring, sends a notification to the mobile communication device to temporarily wake up the SIM and enable the mobile communication device to initiate transfer of an updated service token for the SIM, and
      sends the updated service token to the mobile communication device, whereby the SIM is activated on the mobile communication device based on the updated service token without a need for reauthentication.

9. The entitlement server of claim 8, wherein the application, when executed by the at least one processor, further re-initiates the refresh timer for the updated service token on the mobile communication device, and wherein the SIM is activated on the mobile communication device based on the updated service token prior to expiration of the re-initiated refresh timer.

10. The entitlement server of claim 9, wherein the application, when executed by the at least one processor, further:
   receives an updated status of the SIM from the mobile communication device, wherein the updated status of the SIM indicates that the SIM is on, and
   stores the updated status of the SIM as associated with the identifier of the mobile communication device.

11. The entitlement server of claim 10, wherein the application, when executed by the at least one processor, further:
   receives a second updated status of the SIM from the mobile communication device, wherein the second updated status of the SIM indicates that the SIM is off,
   stores the second updated status of the SIM as associated with the identifier of the mobile communication device,
   receives a transfer SIM request from a transfer mobile communication device to transfer the SIM from the mobile communication device to the transfer mobile communication device, and
   in response to receiving the transfer SIM request, notifies, based on the stored second updated status of the SIM, at least one of the mobile communication device or the transfer mobile communication device that the SIM is off on the mobile communication device to enable the SIM to be turned on for initiation of the transfer of the SIM from the mobile communication device to the transfer mobile communication device.

12. The entitlement server of claim 8, wherein the entitlement server stores the status of the SIM by storing the status of the SIM in a database.

13. The entitlement server of claim 8, wherein the entitlement server stores the status of the SIM by caching the status of the SIM.

14. The entitlement server of claim 8, wherein the at least two SIMs comprise two physical SIMs, one physical SIM and one embedded SIM (eSIM), or two eSIMs.

15. A method for managing a multi-subscriber identity module (SIM) device, the method comprising:
   receiving, by an entitlement server, a status of a SIM from a mobile communication device comprising at least two SIMs, wherein the status of the SIM indicates that the SIM is off;
   storing, by the entitlement server, the status of the SIM as associated with an identifier of the mobile communication device;
   receiving, by the entitlement server, a transfer SIM request from a transfer mobile communication device to transfer the SIM from the mobile communication device to the transfer mobile communication device; and
   in response to receiving the transfer SIM request, notifying, by the entitlement server based on the stored status of the SIM, at least one of the mobile communication device or the transfer mobile communication device that the SIM is off on the mobile communication device to enable the SIM to be turned on for initiation of the transfer of the SIM from the mobile communication device to the transfer mobile communication device.

16. The method of claim 15, wherein the at least two SIMs comprise two physical SIMs, one physical SIM and one embedded SIM (eSIM), or two eSIMs.

17. The method of claim 15, further comprising receiving, by the entitlement server, a SIM type indication of the SIM from the mobile communication device in response to the SIM being provisioned.

18. The method of claim 17, further comprising verifying, by the entitlement server, the SIM type indication for the SIM by communicating with a different server.

19. The method of claim 17, further comprising receiving, by the entitlement server, a different SIM type indication for a second SIM from the mobile communication device in response to the second SIM being provisioned on the mobile communication device, wherein different services are provided to the mobile communication device when the second SIM is activated on the mobile communication based on the different SIM type indication than when the SIM is activated on the mobile communication device.

20. The method of claim 15, further comprising:

initiating, by the entitlement server, a refresh timer for a service token on the mobile communication device that is associated with the SIM;

prior to the refresh timer expiring, sending, by the entitlement server, a notification to the mobile communication device to temporarily wake up the SIM and enable the mobile communication device to initiate transfer of an updated service token for the SIM; and sending, by the entitlement server, the updated service token to the mobile communication device.

\* \* \* \* \*